Nov. 4, 1958     F. B. EASTON     2,859,046
STABILIZER BEAM STRUCTURE FOR AIR
CUSHION VEHICLE SUSPENSION

Filed Feb. 14, 1957     2 Sheets-Sheet 1

INVENTOR.
FRANKLIN B. EASTON
BY RICHEY, WATTS, EDGERTON,
McNENNY & FARRINGTON
ATTORNEYS

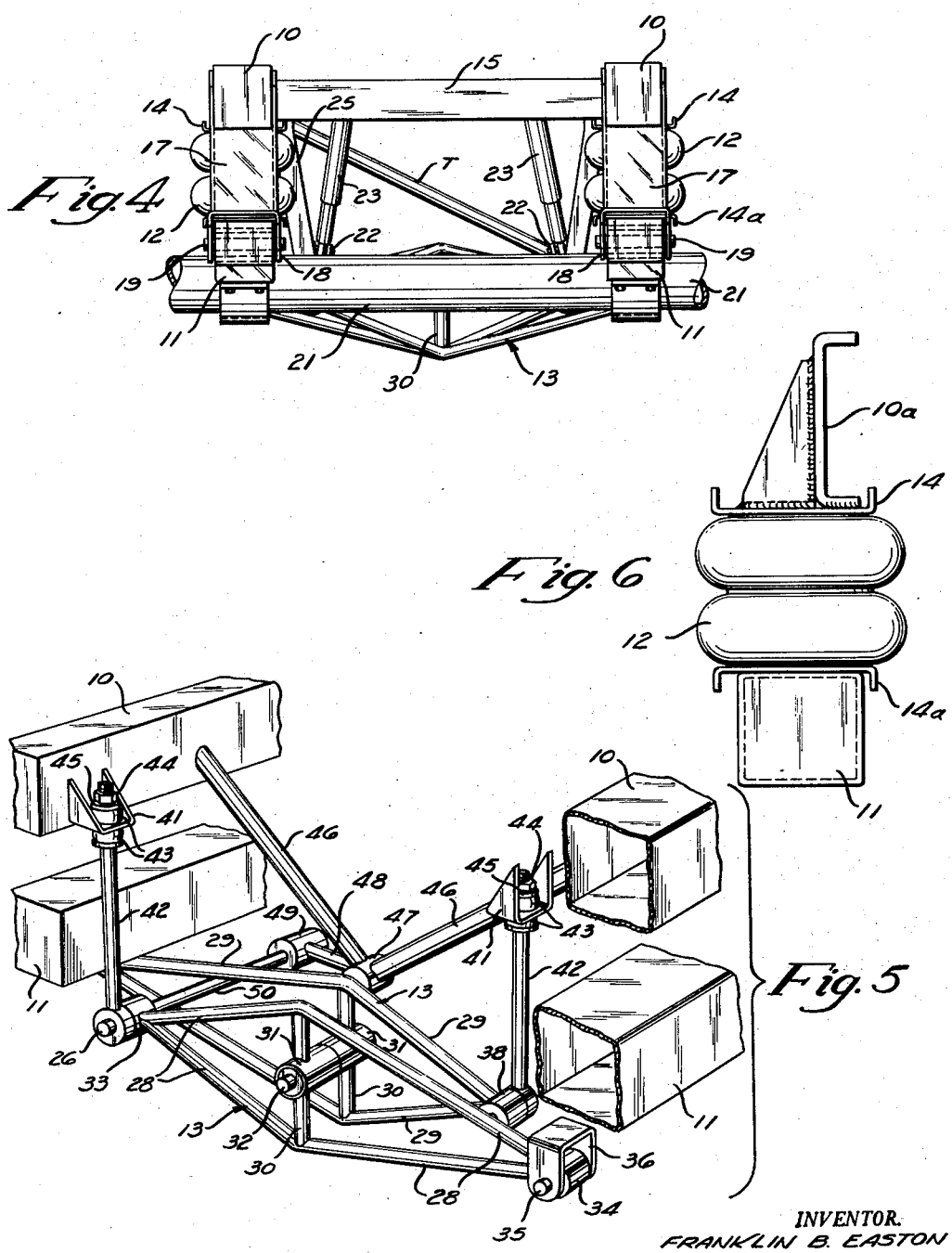

United States Patent Office 2,859,046
Patented Nov. 4, 1958

2,859,046

STABILIZER BEAM STRUCTURE FOR AIR CUSHION VEHICLE SUSPENSION

Franklin B. Easton, Salem, Ohio, assignor to Youngstown Steel Car Corporation, Niles, Ohio, a corporation of Ohio Application February 14, 1957, Serial No. 640,098

7 Claims. (Cl. 280—104)

This invention relates to improvements in undercarriages for road vehicles of the type that embody air spring suspension assemblies.

The object of the invention resides in the provision of an air spring stabilizer that confines flexure of the air cells that carry the load to movement in a vertical plane.

To this end the invention contemplates a pair of parallel levers of the first order fulcrumed, adjacent their centers, in a rubber journal bearing on a common wrist pin, one end of each lever being pivoted to the adjacent frame beam of the vehicle undercarriage, and the other end of each lever being pivoted to the adjacent air spring sub-frame. Such structure delimits transaxial flexure of the air cells initiated by undulations in the road, restrains lineal movement of the air cell supporting members consequent to the sudden application of the brakes, and equalizes the load imposed on the air cells when the vehicle is improperly loaded or operated on a crowned highway.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 4 is an elevational view of the forward end of the undercarriage;

Fig. 5 is a view in perspective of a fragmentary portion of the undercarriage illustrating a modified form of the bolster supporting linkage, portions of the frame members being broken away and shown in section in the interest of clarity; and Fig. 6 is a vertical sectional view of an alternate form of the beams that support the vehicle body.

Figure 1:
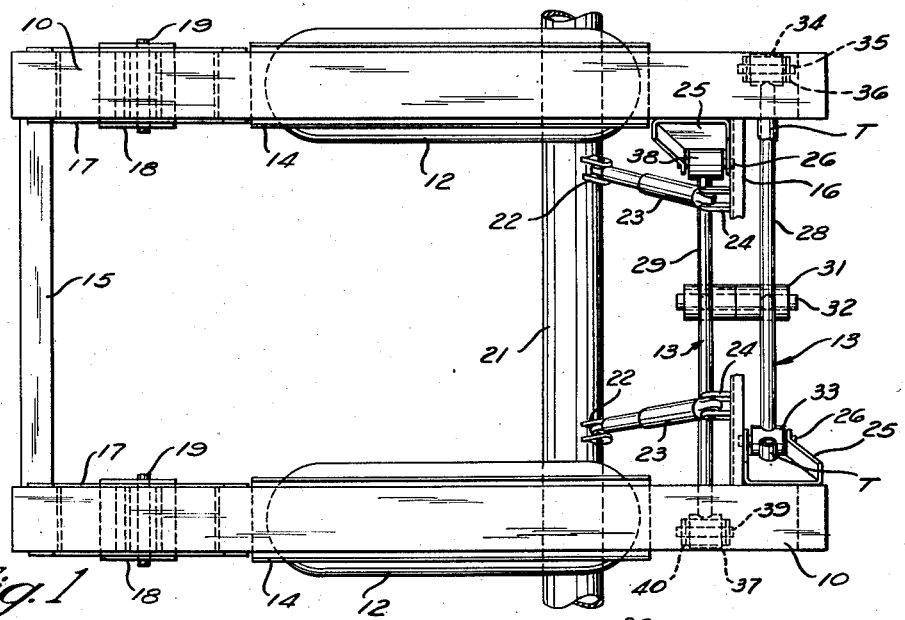
Fig. 1 is a plan view of the improved undercarriage and air spring stabilizer mechanism.
Figure 2:
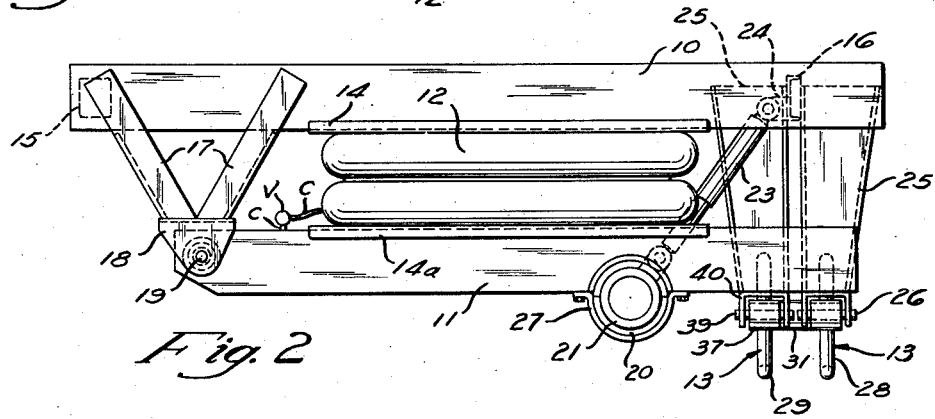
Fig. 2 is a side elevational view thereof.
Figure 3:
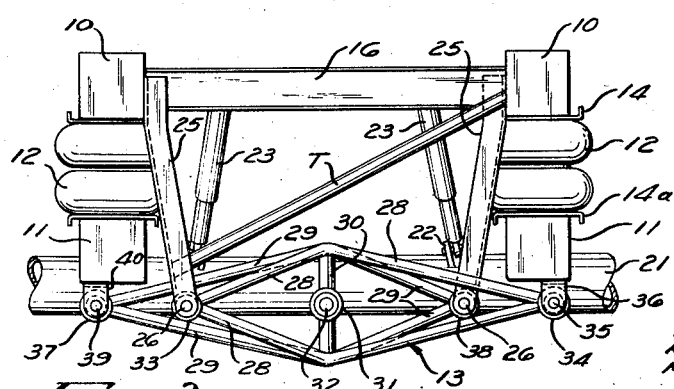
Fig. 3 is an elevational view of the rearward end of the undercarriage.

Referring first to Fig. 3, the undercarriage comprises a pair of parallel beams 10 for the support of the sills of the vehicle body, a pair of bolsters 11 subjacent and parallel thereto, air cells 12 intermediate the channels and bolsters, and a pair of levers 13 of the first order pivoted respectively to the beams and opposed bolster and pivoted to each other intermediate their ends.

In detail, the beams 10 are formed of fabricated steel plates welded to form prismoidal air tight bodies of square transverse section constituting surge tanks for the rubber air cells 12. The lower face of each beam is provided with a shallow channel iron 14 having the upper face of one of the air cells vulcanized thereto, and the bolsters 11 are provided with similar inverted channels 14a vulcanized to opposed faces of the air cells. When the body manufacturer employs beams or channel irons 10a of a requisite vertical height to support the sub-frame, such channels may be substituted for the fabricated steel structure of the beams 10, as illustrated in Fig. 6, and the bolsters 11 may be constructed to form air tight chambers which may be used as surge tanks for the air cells 12. The surge tanks in either the beams 10 or bolsters 11 are interconnected with the air cells by conduits C having check valves V therein to limit the flow of air into the surge tanks to stiffen the spring under heavy impact loads, or check its rapid return to the air spring after compression to prevent rebound, or both, similar in action to a hydraulic shock absorber.

The beams 10 are interconnected by a front cross member 15 of square transverse section and a rear cross channel iron 16 welded or otherwise affixed to the beams. The forward ends of the beams are provided with depending convergent channel irons 17 having a portion of the webs therefor sheared therefrom, and the adjacent flanges thereof welded to the opposed faces of the beams. The lower ends of the channel irons are welded to brackets 18 having spaced depending ears thereon which are pierced to support rubber clad pins 19 pivotally mounted in the forward ends of the bolsters 11. The lower faces of the rearward portion of the bolsters are recessed, and rubber sleeves constituting bearings 20 are seated thereon and retained by bearing caps 27 which encompass the lower half of the bearings and clamp the axle 21 in place. The axle is provided with brackets 22 adjacent the ends thereof for the support of shock absorbers 23 pivoted at their upper ends in brackets 24 welded to the rear cross channel iron 16.

The inner faces of the rearward ends of the beams 10 are provided with depending channel irons constituting hangers 25 having the end portions of the webs thereof removed and the flanges drilled for the support of rubber clad pins 26. The pin in the hanger on the left beam 10 (Fig. 3) is pivoted to a lever 28, and the pin in the hanger on the right beam is pivoted to a similar lever 29. The levers are preferably constructed from steel tubing welded to form opposed triangular sections, each having a common base comprising a strut 30 provided with a journal bearing 31 intermediate its ends for the reception of a rubber clad wrist pin 32. The ends of the lever 28 are formed with tubular journal bearings 33 and 34 engaged respectively with the pin 26 in the left hanger, and a similar pin 35 in a bracket 36 depending from the base of the right hand bolster 11. The ends of the lever 29 are formed with journal bearings 37 and 38 engaged respectively with the pin 26 in the right hanger, and a similar pin 39 in a bracket 40 depending from the base of the left hand bolster 11.

The thickness of the rubber on the wrist pin 32 is approximately five-eighths of an inch and the journal bearing 31 therefore is snugly engaged therewith to cushion the strains imposed thereon when the levers 28 and 29 are oscillated about the wrist pin 32.

When the wheel (not shown) on the right side of the axle 21 is elevated, due to a protuberance in the road, the right air cell will be compressed and cause the lever 28 to rock about the wrist pin 32, thus causing a proportional depression of the left air cell. Conversely, when the left wheel encounters a road protrusion, the left air cell will yield and the lever 29 will effect a compensative flexure of the right air cell. Excessive movement of the axle is restrained by the snubbers 23 intermediate the axle and the frame rear cross member 16, and transaxial movement of the undercarriage is restrained by the hinged connection between the beams and bolsters; the connection between hangers, levers and bolsters, and the arrangement of the snubbers.

One of the beams 10 has a brace rod or tracking bar T welded thereto and to the lower end of the opposed hanger 25 adjacent the bearing 33. As side loads are imposed upon the bolsters 11, the rod T will resist the movement thereof and transfer the load to the center bearing 32, thus effectuating the tracking relation of the vehicular wheels.

In the modified form illustrated in Fig. 5, angle iron brackets 41 are welded to the inner faces of the rearward ends of the beams 10 and depending eye bolts 42 supported thereby may be substituted for the depending hangers to support the levers 28 and 29. The brackets 41 are drilled to receive the threaded ends of the eye bolts, and rubber blocks 43 retained by nuts and washers 44 and 45 are mounted on the bolts 42 on the opposed faces of the web of the angle iron brackets 41. The ends of the arms are pivotally connected to the eyes in bolts 42 to afford the arcuate movements of the levers in the same manner, though with greater flexibility, as the rubber clad pins 33 and 38. In this embodiment, the bolsters 11 are retained in parallel relation with the beams 10 by a tracking bar assembly comprising a pair of arms 46 welded to and depending from the beams 10 connected at their lower ends to a center block 47 having a horizontal strut 48 affixed thereto. The end of the strut 48 supports a bearing 49 which is connected to an arm 50 coupled in turn to the bearing 33. Thus, as side loads are imposed on the bolsters 11, the arms 46, strut 48 and arm 50 will transfer the load to the pin 32 thereby resisting and distributing the tracking loads to the bolsters and axle 21.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An undercarriage for a vehicular air spring comprising a pair of parallel beams, front and rear frame cross members affixed to and uniting said beams, brackets affixed to and depending from the forward ends of said beams, parallel bolsters pivoted for vertical movement on said brackets, air cells secured to said bolsters and engaged with said beams to cushion shocks imposed upon said beams, an axle affixed to said bolsters in transaxial relation thereto, vertical hangers affixed to and depending from the rearward ends of said beams and terminating subjacent said bolsters, a pair of parallel transversely disposed levers of the first order each pivoted at one end to the adjacent bolster and at the other end to the opposed hanger, a wrist pin journaled in each of said levers intermediate their ends, and a tracking bar rigidly secured at one end thereof to one of said beams and at its other end to the opposed hanger to restrain lateral movement of said air cells.

2. An undercarriage for a vehicular air spring comprising a pair of parallel beams, front and rear frame cross members secured to and uniting said members, brackets secured to and depending from the forward ends of said beams, bolsters pivotally connected for vertical movement to said brackets subjacent thereto, air cells affixed to said bolsters and engaged with said beams to absorb shocks imposed upon said beams, an axle affixed to said bolsters in transaxial relation thereto, hangers affixed to and depending from said beams, a pair of lever arms transaxial said bolsters, a pin pivotally connecting said levers together intermediate their ends, a rubber sleeve on said pin to afford limited universal movement of said levers, each lever pivoted at one end to the adjacent bolster and at its opposed end to the adjacent hanger, and a tracking bar secured to one of said beams and secured at its opposed end to the opposed hanger to restrain lateral movement of the bolsters.

3. An undercarriage for a vehicular air spring comprising a pair of parallel beams, front and rear frame cross members affixed to and uniting said beams, brackets affixed to and depending from the forward ends of said beams, bolsters subjacent said beams pivoted at their forward ends to said brackets, air cells affixed to said bolsters and supported intermediate said beams and said bolsters to minimize shocks imposed on said beams, an axle affixed to said bolsters in transaxial relation thereto, hangers affixed to and depending from the rearward ends of said beams and terminating below said bolsters, a pair of parallel levers disposed in transaxial relation to said beams subjacent said bolsters, said levers being pivoted to each other intermediate their ends, each lever being pivoted at one end to the adjacent bolster and at its opposed end to the lower end of the adjacent hanger, shock absorbers pivotally connected to said axle and to said rear frame cross member to restrain excessive vertical movement of said axle, and a tracking bar connecting one of said hangers to the opposed beam.

4. An undercarriage for an air spring suspension assembly for motor vehicles comprising a pair of parallel beams, front and rear cross members affixed to said beams, brackets secured to and depending from said beams, bolsters subjacent said beams pivoted respectively to said brackets at their forward ends, air cells affixed to said bolsters and engaged with said beams to absorb shocks transmitted to said beams, an axle welded to said bolsters intermediate their ends disposed in transaxial relation thereto, hangers welded to and depending from the rearward ends of said beams and terminating between said bolsters subjacent thereto, a pair of parallel horizontal levers between said bolsters, a pivotal connection between each of said levers intermediate their ends, each lever being pivotally connected at one end to the adjacent bolster, and pivotally connected at their opposed ends to the adjacent hanger, rubber clad pins in the pivotal connections between said levers, said hangers, and said bolsters to facilitate universal movement thereof, and a tracking bar connected at one end to one of said hangers, and at its other end to the opposed beams.

5. An undercarriage for a pneumatic air spring for a motor vehicle comprising a pair of parallel beams, front and rear cross members affixed to said beams, depending brackets affixed to said beams, bolsters pivoted to said brackets subjacent and parallel to said beams, air cells affixed on said bolsters and engaged with said beams, an axle affixed to said bolsters in transaxial relation thereto, hangers affixed to and depending from the rearward ends of said beams and terminating subjacent thereto, a pair of levers pivoted to each other intermediate their ends, each lever pivoted at one end to the adjacent hanger and its other end to the adjacent bolster, vertical upwardly disposed brackets on said axle adjacent the ends thereof, shock absorbers to restrain excessive movement of said beams pivotally connected at one end thereof to said brackets and at their opposed end to said rear frame cross member, and means connected at one end to one of said hangers and at its opposite end to one of said beams to restrain lateral movement of said bolsters.

6. An undercarriage for a pneumatic air spring for a motor vehicle comprising a pair of parallel beams, front and rear frame cross members affixed thereto and uniting said beams, arms affixed to and depending from the forward ends of said beams, bolsters pivoted thereto, air cells affixed to said bolsters and engaged with said beams, a vehicular axle affixed to said bolsters in normal relation thereto, a pair of levers parallel said axle pivotally connected to each other intermediate their ends, hangers affixed to and depending from the rearward ends of said beams and terminating subjacent said bolsters, each lever pivotally connected at one end to the hanger on one of said beams, and pivotally connected at the other end thereof to the bolster opposite said hanger, shock absorbers pivotally connected to said axle and to said frame rear cross member to minimize vertical vibrations imposed thereon, and a bar secured at one end to one of said beams, and at its opposed end to one of said hangers to restrain lateral movement of said bolsters and delimit lateral movement of said hanger.

7. An undercarriage for a vehicular air spring comprising a pair of parallel beams, front and rear frame cross members connected to said beams, brackets affixed to and depending from said beams, parallel bolsters pivoted to said brackets, air cells secured to said bolsters and engaged with the lower faces of said beams, an axle affixed to said bolsters in transaxial relation thereto, hangers affixed to and depending from said beams having openings in the lower ends thereof, rubber clad pins in said openings, brackets affixed to and depending from said bolsters, said brackets having openings in the lower ends thereof, rubber clad pins in the last named openings, a pair of parallel transversely disposed levers yieldably pivoted to each other intermediate their ends, each lever pivotally connected at one end to said rubber clad pin in the adjacent hanger, and at the opposed end thereof to said rubber clad pin in the bracket in the adjacent bolster, and a brace member secured to one of said beams and to the opposed hanger to arrest lateral movement of the bolsters and transaxial movement of the pivotal connection between said levers.

References Cited in the file of this patent

UNITED STATES PATENTS

| | | |
|---|---|---|
| 1,392,974 | Smith | Oct. 11, 1921 |
| 2,431,440 | Willis | Nov. 25, 1947 |
| 2,670,201 | Rossman | Feb. 23, 1954 |